US010788634B1

(12) United States Patent
Koken

(10) Patent No.: US 10,788,634 B1
(45) Date of Patent: Sep. 29, 2020

(54) EVOLUTE TESTER FOR OPTICAL SURFACES

(71) Applicant: Terrell E Koken, Costa Mesa, CA (US)

(72) Inventor: Terrell E Koken, Costa Mesa, CA (US)

( * ) Notice: Subject to any disclaimer, the term of this patent is extended or adjusted under 35 U.S.C. 154(b) by 0 days.

(21) Appl. No.: 16/877,290

(22) Filed: May 18, 2020

(51) Int. Cl.
*G02B 6/42* (2006.01)
*G02B 7/00* (2006.01)

(52) U.S. Cl.
CPC ........... *G02B 6/4221* (2013.01); *G02B 7/003* (2013.01); *G02B 6/425* (2013.01)

(58) Field of Classification Search
None
See application file for complete search history.

(56) References Cited

U.S. PATENT DOCUMENTS

| 9,810,873 | B2 | 11/2017 | Avago | |
|---|---|---|---|---|
| 10,613,348 | B2* | 4/2020 | Orozco Rodriguez | B29D 11/00009 |
| 2004/0085650 | A1* | 5/2004 | Fendt | G02C 7/027 359/744 |
| 2015/0316787 | A1 | 11/2015 | Hoya | |

OTHER PUBLICATIONS

U-Arizona-Testing-Curved-Surfaces-and-or-Lenses-I.pptx, Downloaded Oct. 2, 2018.
Zhenzhou Wang, "Technique for measuring the three-dimensional shapes of telescope mirrors," Opt. Eng. 55(9), 094108 (2016), doi: 10.1117/1.OE.55.9.094108.
Maxim Arnold. "Iterating evolutes and involutes," arXiv:1510.07742v2 [math.DS] Sep. 5, 2016.

* cited by examiner

*Primary Examiner* — Tina M Wong
(74) *Attorney, Agent, or Firm* — Guy Cumberbatch

(57) ABSTRACT

Systems and methods for testing and characterization of optical surfaces which works equally well on concave, flat, convex, and non-conic optical surfaces, and which does not require that a master surface be first produced. The method is automatic and requires little human intervention. It provides an extremely high degree of accuracy, and provides repeatability of measurements within a minuscule tolerance of error. The method determines the evolute of the surface automatically, deterministically, and repeatably via orthogonal reflection by ascertaining the evolute of the surface's figure along multiple diameters of the surface.

20 Claims, 14 Drawing Sheets

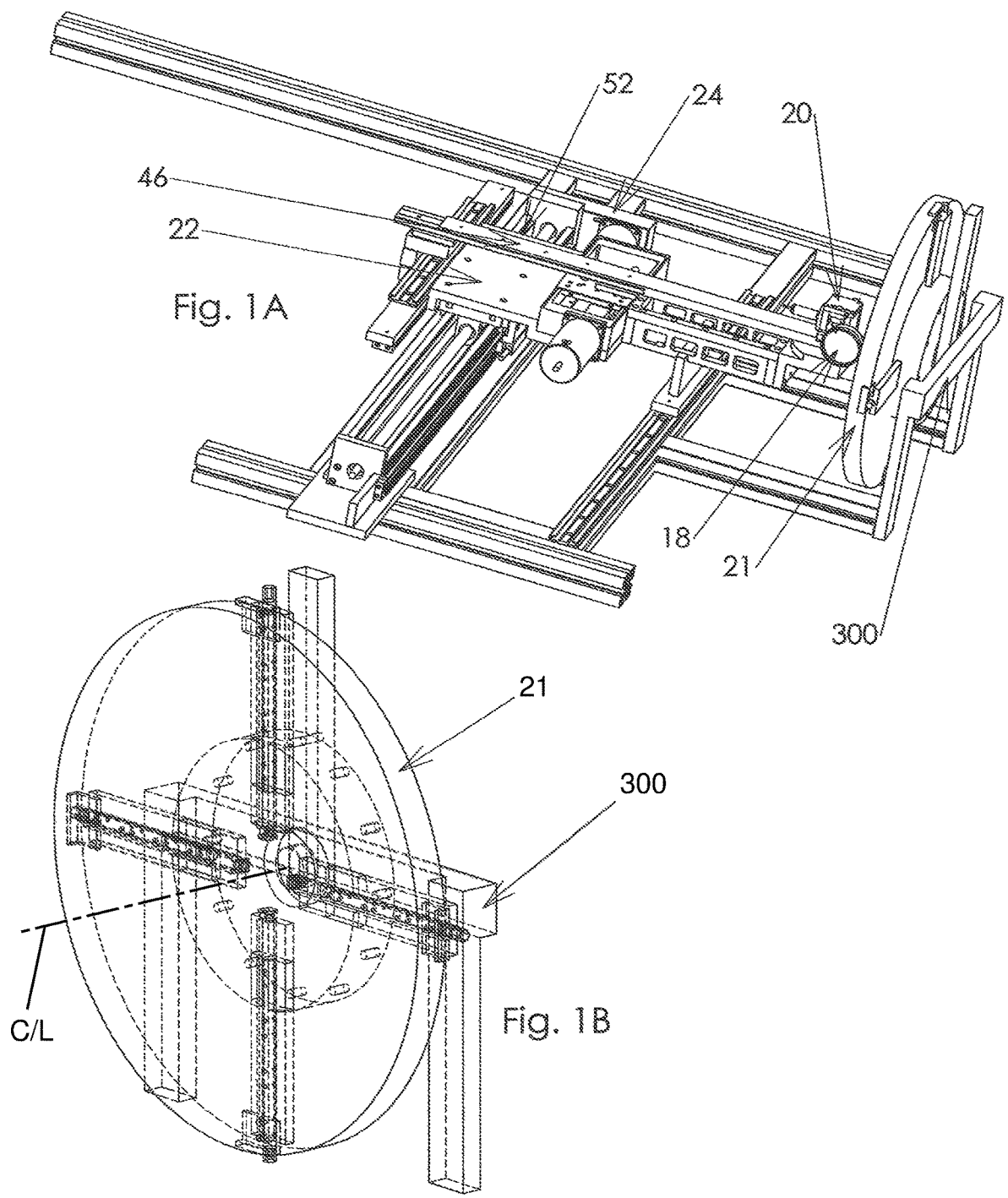

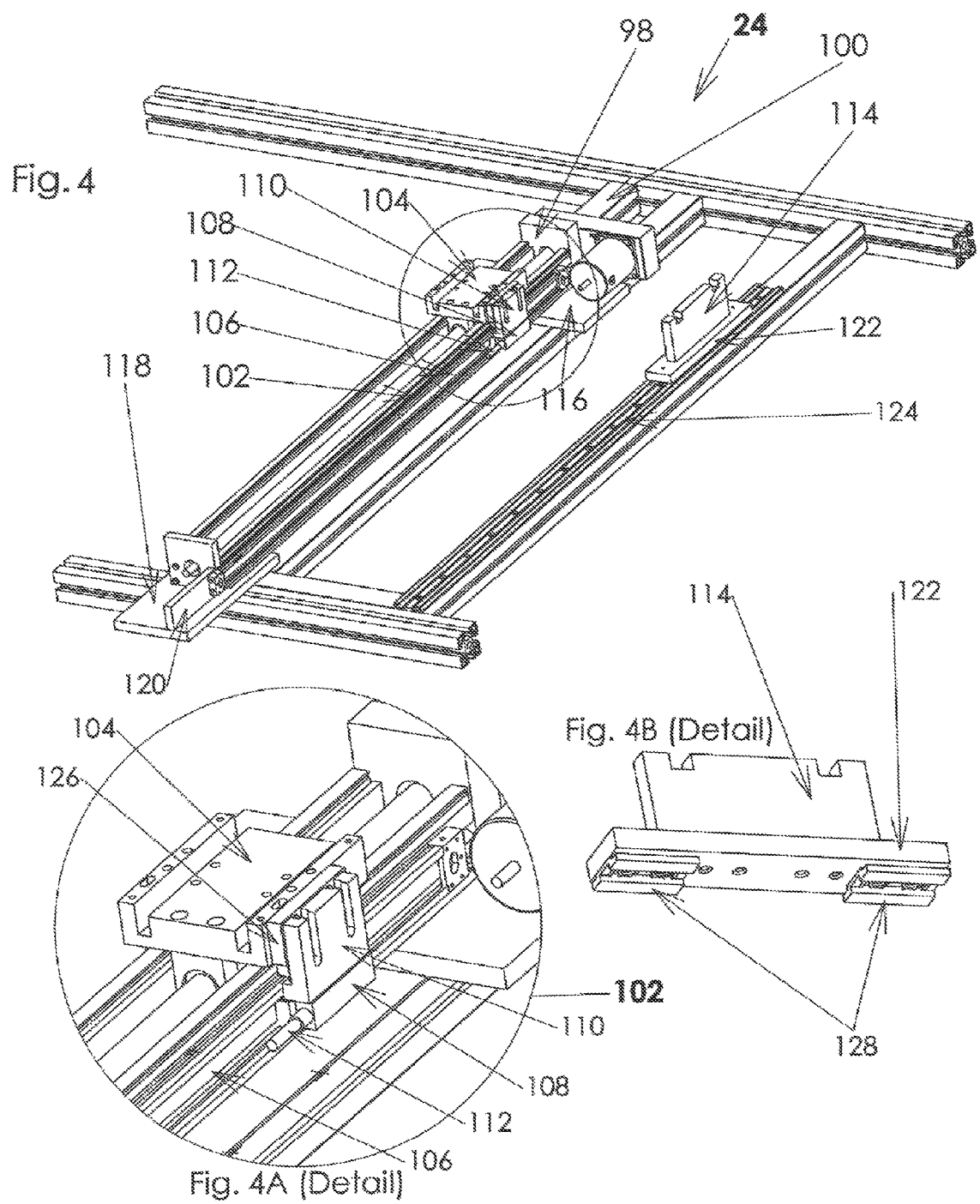

EVOLUTE TESTER FOR OPTICAL SURFACES

FIELD OF THE INVENTION

The present invention is directed to testing and characterization of optical surfaces, including concave, flat, convex, and non-conic optical or reflective surfaces. It does not require that a master surface be first produced.

BACKGROUND OF THE INVENTION

The Frenchman Leon Foucault in 1858 invented a method of testing concave optical surfaces using a pinhole, light source, and knife-edge. Refinements of this method permit characterization of such surfaces to a tolerance of about $1/10$ wavelength of sodium light (the equivalent of two millionths of an inch) for optics having a focal ratio slower than about f/2.0, and have permitted amateur telescope makers to construct excellent telescopes using very minimal tooling. The focal ratio, or f/number, is the focal length divided by the diameter of the surface. "Fast" means a low f/number (big fast lens on a camera might be an f/1.5, small or slow lens, f/8 or so). The faster a lens, the quicker the exposure can be in photography: at f/1.5 you can shoot at $1/1000$ of a second, but at f/8, the shutter needs to be open 29 times longer, which amounts to $1/35$ of a second, to get the same amount of light on the film. "Fast" optics are much harder to get right.

The Italian Vasco Ronchi in 1923 invented a method based on the Foucault test, using a coarse grating instead of a knife-edge. It offered an alternative to, and an incremental improvement in accuracy over, the Foucault test. It, too, tests only concave optical surfaces.

In 1929 the Argentinian astronomers Gaviola and Platzeck invented the so-called Caustic test, which took measurements involving radii of curvature. This was publicized by Irvin Schroader in Albert Ingalls' book, Amateur Telescope Making Book Three, published in 1953. Schroader claimed that the Caustic test could detect errors in a concave reflecting optic on the order of $1/100$ wavelength of sodium light, though this is not true for optics faster than about f/3.3. It must be emphasized that this test also only works on concave surfaces. The term "caustic" here is a misnomer, first used by Platzeck and Gaviola, propagated by Schroader, and carried on by those who followed. The definition of the term is as follows:

Caustic (Optics): a surface to which rays reflected or refracted by another surface are tangents. Caustic curves and surfaces are called catacaustic when formed by reflection, and diacaustic when formed by refraction.

The actual test proposed by Platzeck and Gaviola was based on centers of curvature, not the envelope of reflected rays, and thus bears a loose relationship to the evolute of a curve.

Evolute:

The locus of centers of curvature of a curve. Equivalently, the evolute is the envelope of normals to the curve.

Interferometric tests have also been devised, but they require the preparation of a master surface against which comparison can be made, as does the testing of non-concave surfaces. Such master surfaces must be ground and polished to an extremely high degree of precision; the work is not economically feasible unless multiple surfaces of a kind are to be produced. The production surfaces are then tested via interference fringes with relation to the master.

There remains a need for a way to test and characterize convex, flat, and non-conic optical or other reflective surfaces without requiring production of a master surface.

SUMMARY OF THE INVENTION

The invention pertains to the testing and characterization of optical or other reflective surfaces. The invention provides a method of testing and characterization which works equally well on concave, flat, convex, and non-conic optical surfaces, and which does not require that a master surface be first produced. The method is automatic and requires little human intervention. It eliminates the need for fallible human judgment of the character and darkness of shadows. It provides an extremely high degree of accuracy, and provides repeatability of measurements within a minuscule tolerance of error.

The imaging properties of an optical device are primarily dependent on the character and characterization of its surfaces, and secondarily on the reflective and refractive properties of the elements of the device that contain the surfaces. Accuracy in the characterization or measurement of such surfaces determines the imaging properties, and has been the aim of every method of optical testing ever devised.

An automated method of ascertaining the figure of an optical surface by determining the evolute of the figure is disclosed. The method tests surfaces automatically, deterministically, and repeatably via orthogonal reflection by ascertaining the evolute of the surface's figure along multiple diameters of the surface. It is not limited to concave optical surfaces, but may be applied to convex and flat surfaces, and is not limited to second-degree (conic section) curves.

The implementation of this method desirably requires:

An assembly, hereafter called the Laser Head, comprising:

A laser whose most salient property is a narrow beam width;

A beam splitter;

A detector for a reflected laser beam which has a very narrow angle of detection;

A frame for holding the laser, detector, and beam splitter in precise alignment;

A measuring device, hereafter called the X-Unit, for ascertaining the distance of the detector from the surface under test;

A device, hereafter called the Slope Unit, for varying the direction in which the laser head's laser beam projects with respect to the optical axis of the surface under test, also in small increments, with a means of measuring the slope of this direction ("m") (This is in essence a precision goniometer);

A device, hereafter called the Intercept Unit, for changing the position of the laser head in a direction perpendicular to the aforementioned optical axis, and doing so in small increments, with a way to measure this position; this ascertains the Y-coordinate at which each measurement of the slope unit is taken;

A computer and a software program to vary and record the above quantities, to ascertain and record the intensity of the reflection of the laser beam from the surface under test, and to calculate the straight line along which the laser beam returns orthogonally from the surface to the detector through the beam splitter, given X, Y, and the slope, m;

Electronic components to interface the computer to the aforementioned devices, via a Universal Serial Bus or other means;

A test stand capable of rotating the optic about the aforementioned optical axis, either automatically under program control or manually, but in either case repeatably; and A systematic method for marking the optic such that the rotational positions are recoverable and repeatable for comparison with subsequent tests.

The nature, features, and advantages of the present invention will become appreciated as the same become better understood through reference to the specification, claims, and appended drawings.

BRIEF DESCRIPTION OF THE DRAWINGS

FIGS. 1 and 1A are overall views of a possible embodiment of the invention, showing three major sub-assemblies and a fourth, minor, one. A test stand with an optic mounted on it is also shown. The figure shows the full assembly of the Intercept Unit with the Slope Unit mounted on it, and the Laser Head mounted on the Slope Unit. The X-Unit is also shown in its simplest form, a dial gauge.

FIG. 1B shows the test stand with optic mounted on it from a frontal view.

FIG. 3A shows the carriage, stepper motor, rails, and swivels of the Slope Unit for ascertaining the slope "m" of the emitted and returning beam. The Slope Arm (46) is shown here in a slightly positive position.

FIG. 3B shows the same Slope Unit with the Slope Arm (46) in a maximum negative position, from a viewpoint to the left of that of FIG. 3A.

FIG. 3C is an exploded view of the Slope Arm (46) and associated attachments thereto obliquely from its underside, with several parts which cannot be seen in the previous two figures.

FIG. 3D is an exploded view of the Slope Arm (46) and attachments shown obliquely from above.

FIG. 4 shows an embodiment of the Intercept Unit as a standalone entity using a stepper motor, leadscrew, and position scale and reader, while FIG. 4A is an enlargement of the measurement unit thereof and FIG. 4B is a perspective view of an underside of a spacer block that forms a part of the Intercept Unit. Other embodiments are possible.

DETAILED DESCRIPTION OF THE PREFERRED EMBODIMENTS

The present application provides systems and methods for testing and characterization of optical or other reflective surfaces. The benefits are most likely seen in the optical field, which is a multi-billion dollar per year industry. However, the same techniques may be useful for other reflective surfaces such as a radio antenna, an automotive fender, a curved window, a sculpture, etc. The techniques disclosed herein will thus work on any shiny surface, and the term reflective surface will thus be understood to encompass optical curved surfaces as well as other curved surfaces.

Figure 1:
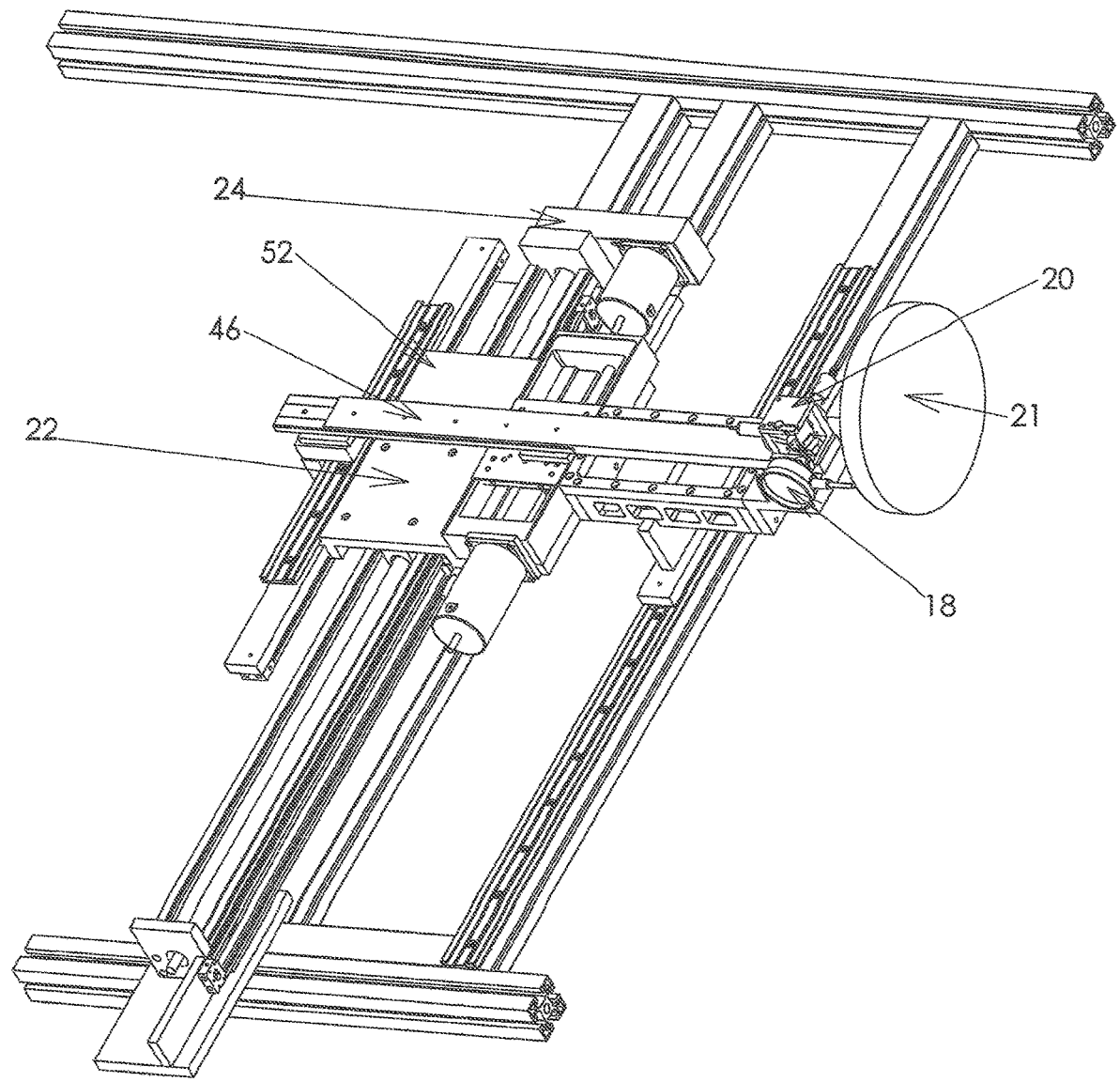
Figure 2:
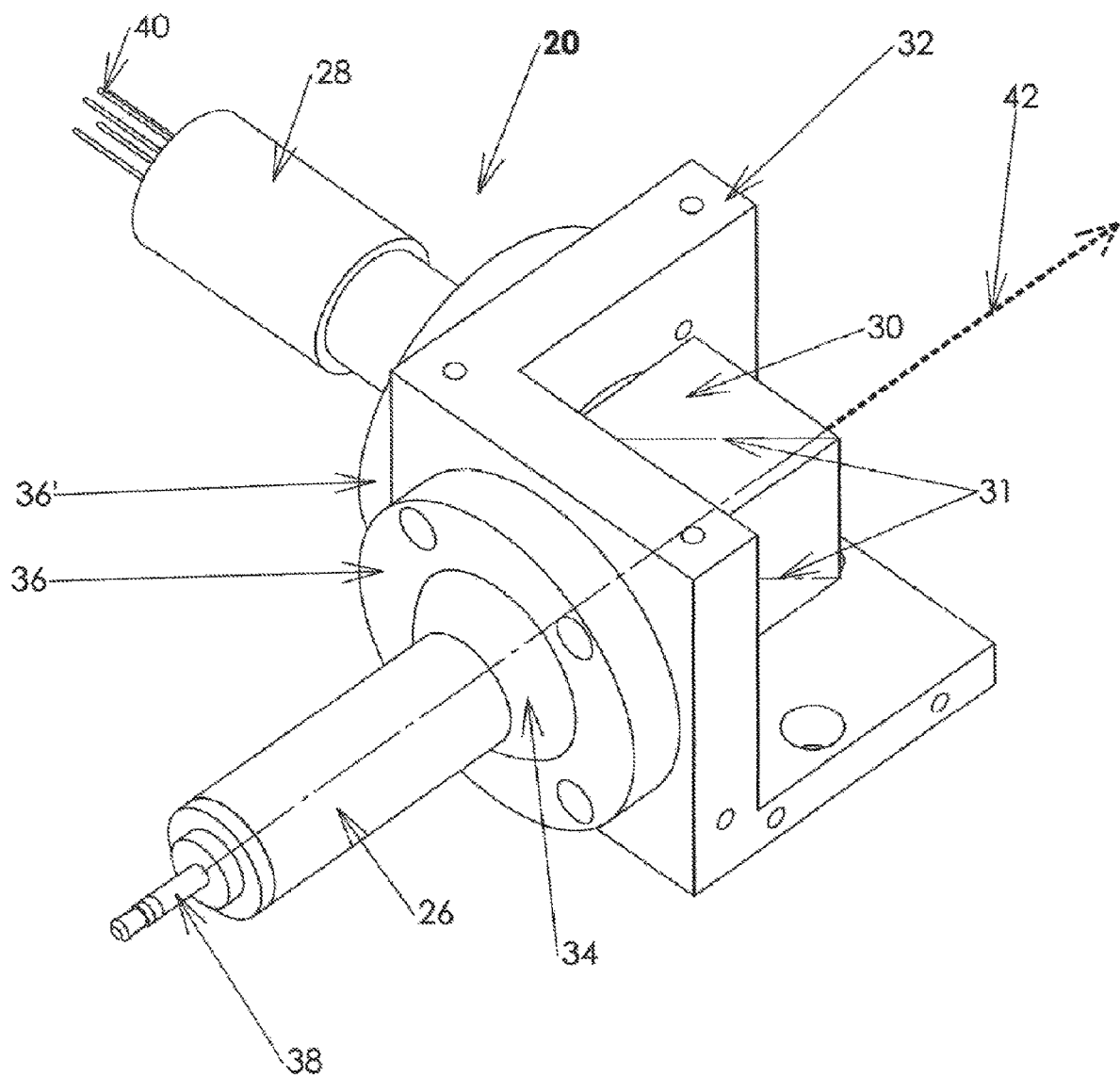
FIG. 2 illustrates an embodiment of the laser head assembly from a viewpoint to the left of the laser.
Figure 3A:
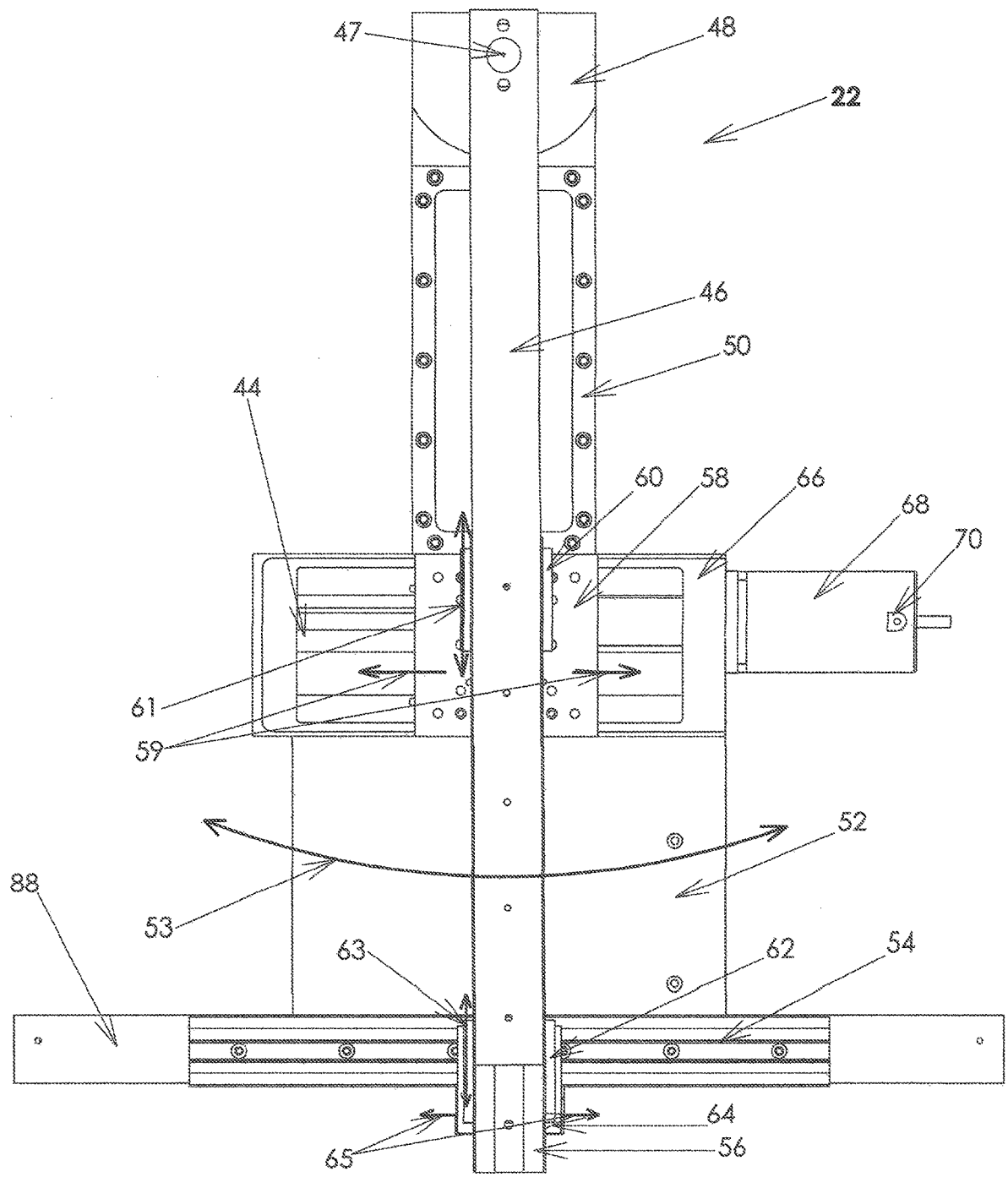
FIGS. 3A, 3B, 3C, and 3D show an embodiment of the Slope Unit using a stepper motor, leadscrew, and position scale with reader. Other embodiments are possible.

FIGS. 1 and 1A show an overall view of the invention. The X-unit 18 is simply a dial gauge, the extreme extension of which is a known offset from the emitter of the laser 26 (FIG. 2) in the laser head 20. In the position shown, it is used to ascertain the distance to a point on the optical surface under test (i.e., a lens or mirror surface), which is shown as item 21. The laser head 20 is mounted on the slope arm 46 of the slope unit 22 (FIG. 3A). The slope unit 22, in turn, is mounted on the intercept carriage 104 (FIG. 4A) of the intercept unit 24 via the four clearance holes in the slope unit base 52 (also seen in FIG. 3A). The optical surface 21 is mounted rigidly but removably on the test stand 300. The test stand 300 is so designed that the optical surface 21 may be marked so that it can be removed for work and replaced in the same position.

In FIG. 1B the optical surface 21 mounted on the test stand 300 is shown in a frontal view. The test stand 300 permits the optical surface 21 to be rotated about its center C/L and locked repeatably in any of several angular orientations with a pin or other such locking mechanism, since the evolute obtained during a test is for a single line from the center of its surface to its outside edge. At least two of these evolutes are required to characterize the surface, since it may not be a surface of revolution, but may possess astigmatism. This allows characterization of astigmatism in the surface, whether desired by design or needing to be eliminated as undesirable. Thus we may test surfaces that are surfaces of revolution and surfaces that are not. A dial gauge (not shown) may be mounted to the vertical arm of the test stand 300 so that the center of the optical surface 21 may be made coincident with the center of rotation of the stand, which is set at the same height as the center of the laser head 20. Details of the stand are given here only for clarity, and one of skill in the art will understand that other configurations of mounting stands may be used In FIG. 2 is shown greater details of one version of the laser head 20 seen in FIG. 1 which projects a laser beam 42 to the optical surface 21 under test. In this embodiment, a laser pointer 26, modified to accept external power through a miniature phone plug 38, is mounted in a holed ball 34 with its emitter coincident with the center of the holed ball 34. The holed ball 34 is socketed in a spherical recess of the dual socket 32, and held in place within a spherical recess of socket cap 36. The beam 42 of the laser is projected to the right through beam splitter 30, to the optical surface 21 under test (FIG. 1). The beam returned from the surface is reflected by the beam splitter's internal surface 31 to the sensor 28, which outputs a signal on the sensor pins 40 indicating the strength of the returned beam.

Figure 2A:
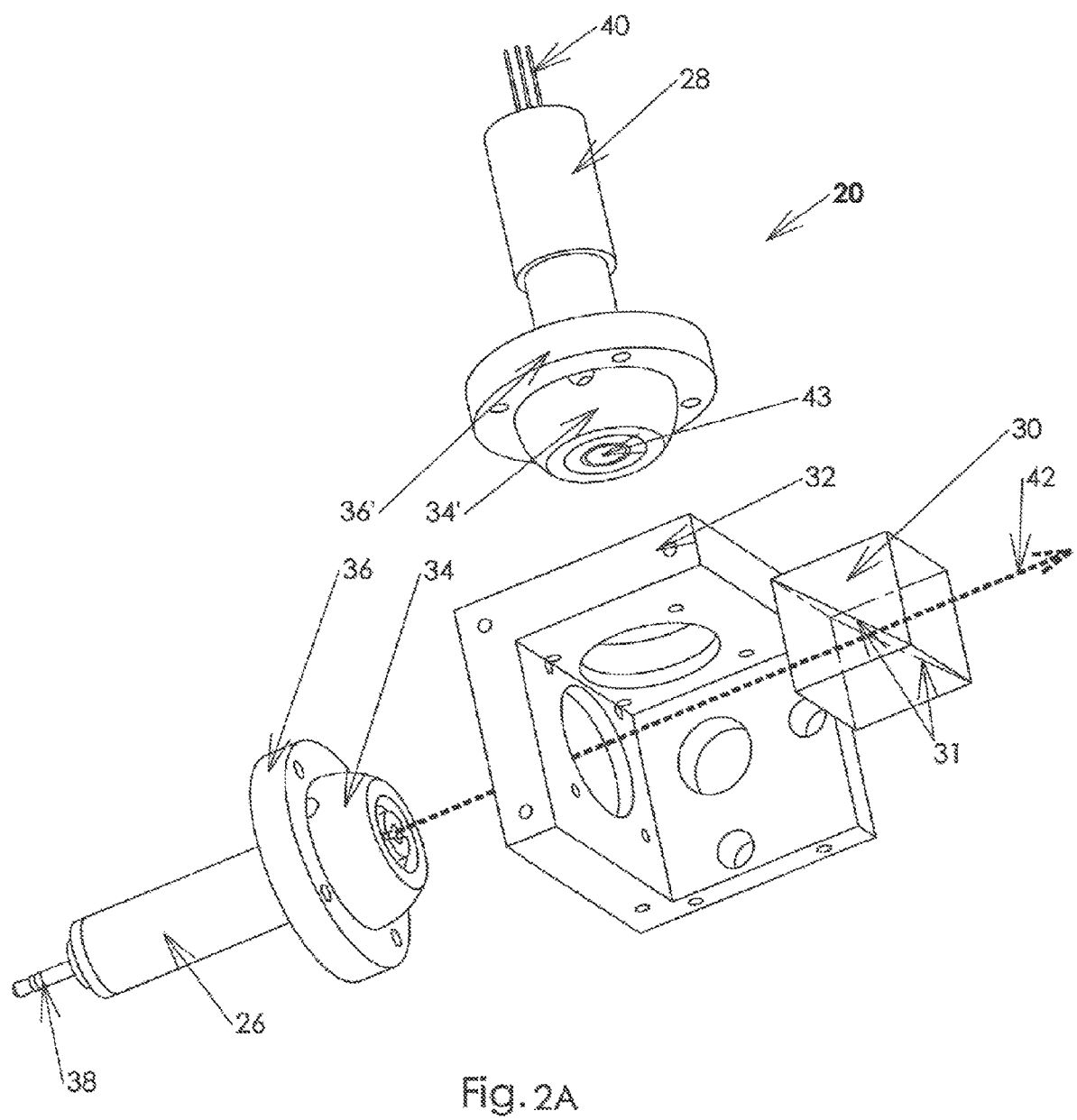
FIG. 2A is an exploded view of the laser head assembly from a slightly different perspective, this time to the right of the laser.

In FIG. 2A an exploded view of the laser head is provided, from a viewpoint to the right of that of FIG. 2. This reveals the second holed ball 34' and the pinhole 43 which are not visible in FIG. 2. The sensor 28 is mounted in the second holed ball 34', which is socketed in the other spherical recess of the dual socket 32, and held in place by the second socket cap 36'.

In FIGS. 3A, 3B, 3C and 3D, an embodiment of the slope unit 22 is shown. The slope unit 22 serves as a high-precision goniometer, an instrument for the precise measurement of angles, capable of measuring the slope of a line to approximately one part in 200,000 or a little less than one arcsecond. This embodiment uses a precision stepper-motor 68 (FIGS. 3A and 3B) for driving it, and a magnetic scale 90 (FIGS. 3B, 3C, and 3D) and scale-reader head 94 (FIGS. 3C and 3D) to ascertain position information. Other embodiments could use different driving methods, e.g., a voice coil for higher speed, and/or different measuring methods, e.g. a laser interferometer for higher precision.

Figure 3B:
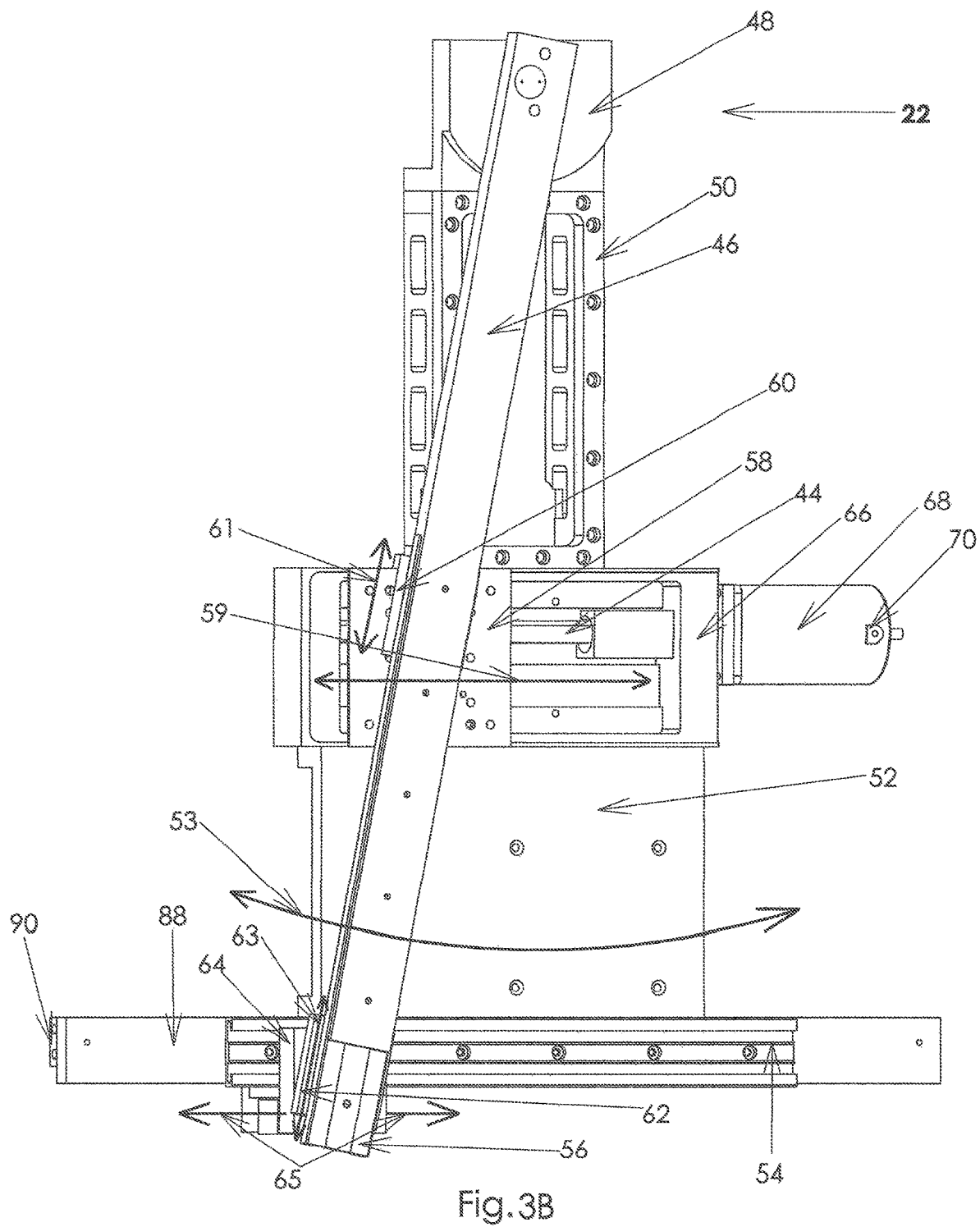
Figure 3C:
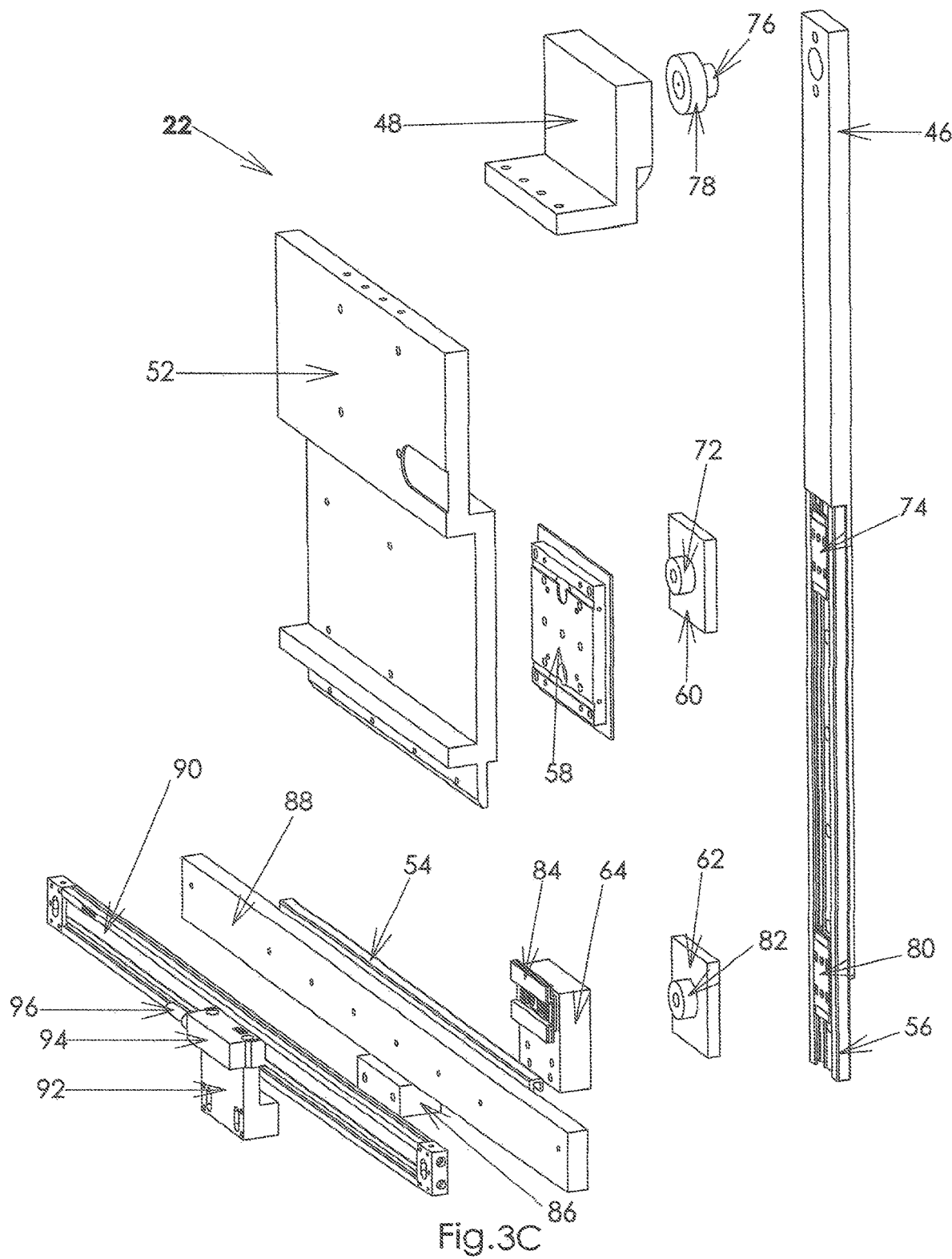
Figure 3D:
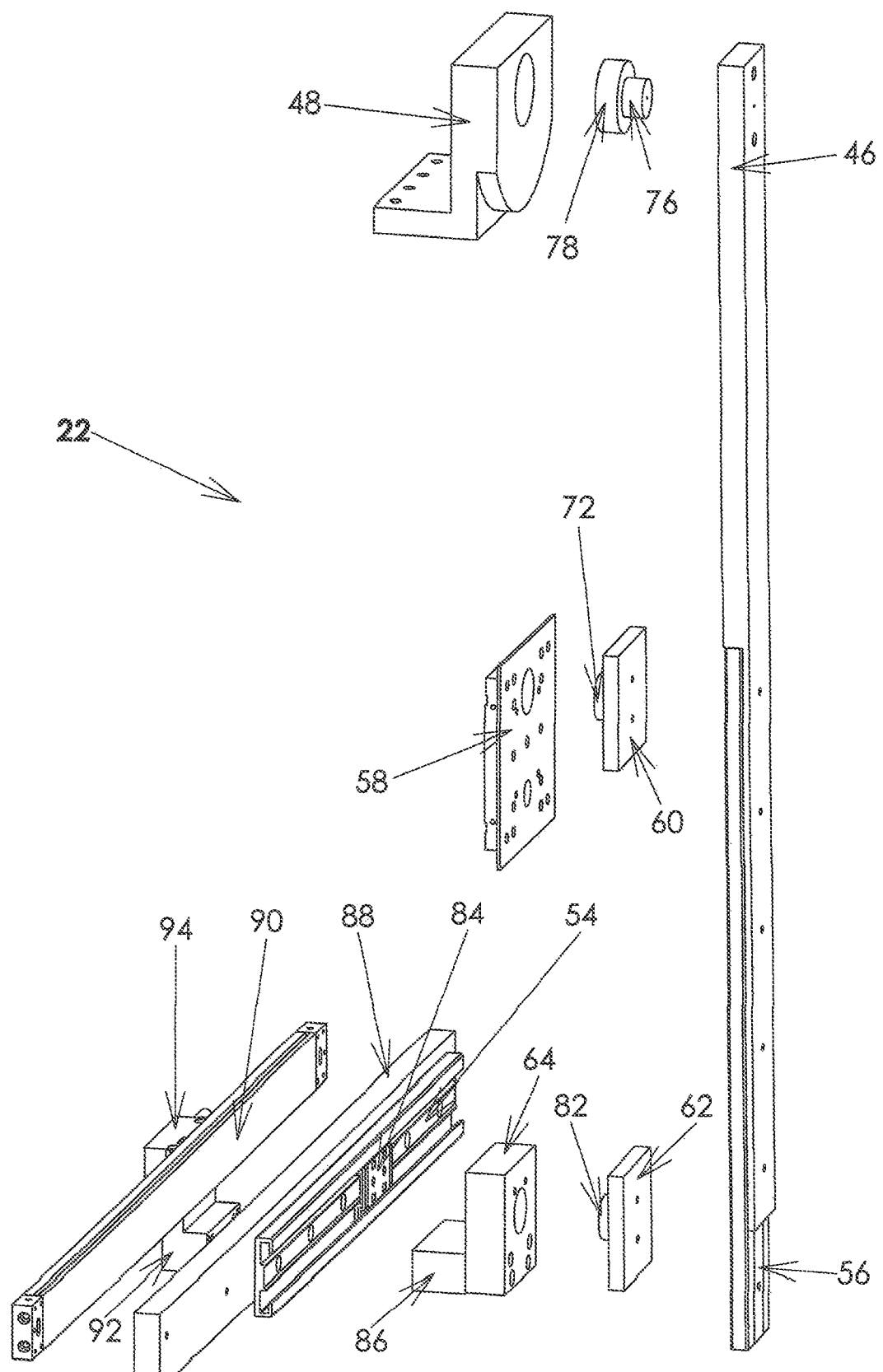

FIG. 3A shows the slope unit 22 from above with the slope arm 46 with attached slope rail 56 pointing in a slightly positive slope (CCW) about a slope axis 47. The position of slope arm 46 is read by read head 94 on scale 90, which is seen in an exploded view from its underside in FIG. 3C. FIG. 3B shows the same unit with the slope arm 46 in its approximately maximum negative position (CW). The slope arm 46 pivots in both directions about the axis 47 (FIG. 3A) which is vertical to the plane of the page. FIG. 3C shows an exploded view of the slope arm 46 with the connecting hardware which cannot be seen in FIGS. 3A and 3B. FIG. 3D shows attachment points which are otherwise invisible in the other three figures.

The slope arm 46 is rigidly attached to the slope rail 56 (FIG. 3C). Via adapter 76 and ball bearing 78 (FIGS. 3C and 3D) it pivots concentrically about the axis 47 (FIG. 3A) in the pocket of arm bearing block 48 (FIGS. 3C and 3D). Referring to FIGS. 3A and 3B, the slope arm 46 and slope rail 56 are driven, as shown by movement arrows 59, by the slope drive unit which comprises leadscrew 44, slope drive base 66, stepper motor 68, drive carriage 58, and cable connector 70. The leadscrew 44 drives drive carriage 58, which in turn drives the positive (CCW) and negative (CW) swing of the slope arm 46 and slope rail 56 (shown by movement arrows 53), by means of ball bearing 72 (FIGS. 3C and 3D). Ball bearing 72 is mounted to slope arm drive element 60 (FIGS. 3C and 3D), which is attached to slope rail drive carriage 74 (FIG. 3C) and socketed in the pocket in drive carriage 58's upper surface (FIG. 3D). Slope rail drive carriage 74 rides in slope rail 56.

The slope arm driven element 62 is attached to rail carriage 80 (FIG. 3C) which also rides in slope rail 56. Ball bearing 82 (FIG. 3C) is mounted on the post of this driven element 62 and drives measurement element 64 via the pocket in its upper face (FIG. 3D). Measurement element 64, in turn, is attached to rail carriage 84. On the same side of measurement element 64 is attached connector block 86 (FIG. 3D), which is in turn attached with a position-adjustable mounting method to reader head mounting bracket 92. This assembly carries and holds in place position encoder reader head 94, which rides on, and reads position data from, position encoder scale 90 (FIGS. 3C and 3D).

Position encoder scale 90, encoder scale mounting bar 88, and measurement rail 54, along with slope unit base 52, form a unit, called the Slope Measurement Base Unit, with position encoder scale 90 and scale mounting bar 88 fastened underneath slope unit base 52 and measurement rail 54 fastened on top of it. Rail carriage 84 (FIGS. 3C and 3D) rides on measurement rail 54 and is attached to the underside of measurement element 64, as described just above. Thus rail carriage 80, slope arm driven element 62, ball bearing 82, measurement element 64, connector block 86, rail carriage 84, reader head mounting bracket 92, and reader head 94 form a unit which moves on both measurement rail 54 and position encoder scale 90 simultaneously at the impetus of measurement arm 46 and slope rail 56. Position is read from position scale 90 by reader head 94 and transmitted to the electronics of the device via position encoder cable 96 (FIG. 3C), shown as a stub here.

The extension of slope arm 46 and slope rail 56 from slope arm drive element 60 to slope arm driven element 62 multiplies precision by a factor that is determined by the ratio of the distance between the axis 47 and the center of the pocket in measurement element 64, to the distance between the axis 47 and the center of the pocket in carriage 58. Distances read via position encoder reader head 94 are directly convertible to the slope of the slope arm 46 and attached slope rail 56. The arm bearing block 48 is rigidly attached to the arm bearing block extension 50 which is rigidly attached to the base 66 of the slope drive unit. The base 66 of the slope drive unit is rigidly attached to the Slope Measurement Base Unit.

Motions of the various components of the slope unit are shown by movement arrows 53, 59, 61, 63, and 65 (FIGS. 3A and 3B). Arc 53 indicates the swing of slope arm 46 with slope rail 56 and all components attached, around axis 47. Impetus for this swing is given by carriage 58, whose motion is shown by movement arrows 59. This also causes motion of drive element 60 in the directions shown by movement arrows 61. Additionally, the motions of rail carriage 80 are shown by movement arrows 63, and the simultaneous motions of rail carriage 84 are shown by movement arrows 65.

Figure 4C:
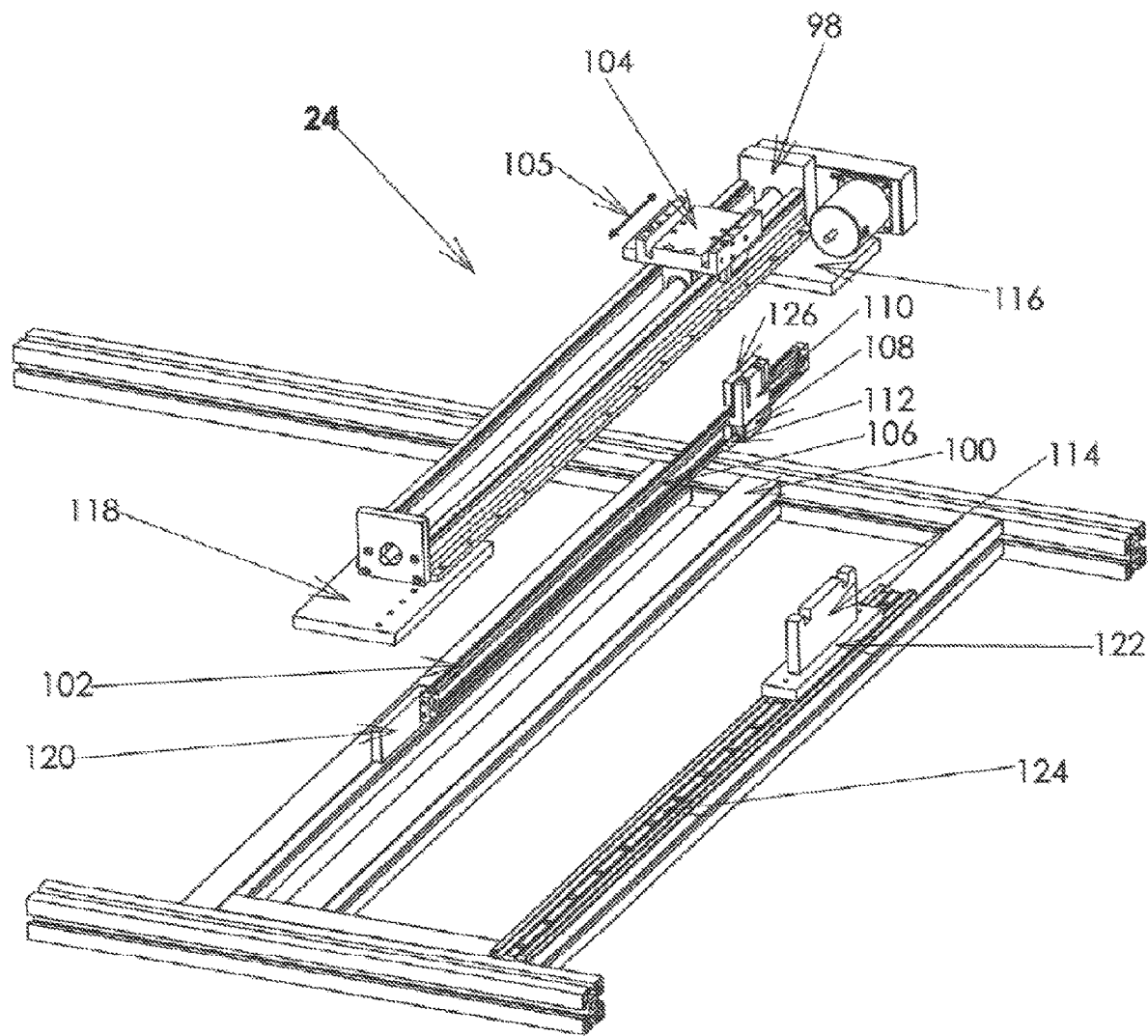
FIG. 4C shows an exploded view of the three major sub-assemblies of the Intercept Unit, viewed unexploded in FIG. 4.

FIGS. 4 and 4C show an embodiment of the intercept unit 24 in assembled and exploded views, respectively. In this embodiment, as with the slope unit 22, a drive unit is provided by a stepper motor, and position measurement is done with a magnetic scale and reader. Again, as with the slope unit, other embodiments could use other units and methods of driving and measurement, such as voice-coil and laser interferometer, for more speed and more precision. In FIG. 4A is shown a detail of the unit comprising items 114, 122, and 128 (twice) that rides on rail 124. Detail circle "4A" in FIG. 4 shows Measurement Unit 102 and associated measurement hardware.

Detail "4B" in FIG. 4 shows the spacer block 114 and spacer base 122 with two rail carriages 128, which reduce backlash from, and provide compliance with, the motion of the intercept carriage 104. These rail carriage units, manufactured by the Igus Corporation of Cologne, Germany, are identical to rail carriage units 74, 80, and 84 (in FIG. 3C), and ride, as shown in FIG. 4C, on extension rail 124.

The intercept unit 24 comprises three major sub-assemblies. These are the extruded base 100 to which is mounted the second sub-assembly, the overall ballscrew unit 98, and the third sub-assembly, the measurement unit 102. These are shown in FIG. 4A and in exploded view in FIG. 4C.

The extruded base 100 consists of several lengths of aluminum extrusion fastened together as shown in FIG. 4C, whose purpose is to act as a framework for the other two sub-assemblies, overall ballscrew unit 98 and measurement unit 102, and to hold extension rail 124, as described above.

The Overall Ballscrew unit 98 in this embodiment comprises a 32" ball screw assembly with stepper-motor drive. It is mounted on lower base 118 and upper base 116, which are used to fasten it to the extruded base 100. The stepper-motor drives the screw which causes the intercept carriage 104 to move in the directions of movement arrow 105.

The Measurement Unit 102 comprises the intercept encoder scale 106, the intercept reader head 108, the intercept reader head bracket 110, and the intercept reader head cable 112 (shown as a stub). A detail of the Measurement Unit 102, with its components, is shown in FIG. 4A.

Figure 5:
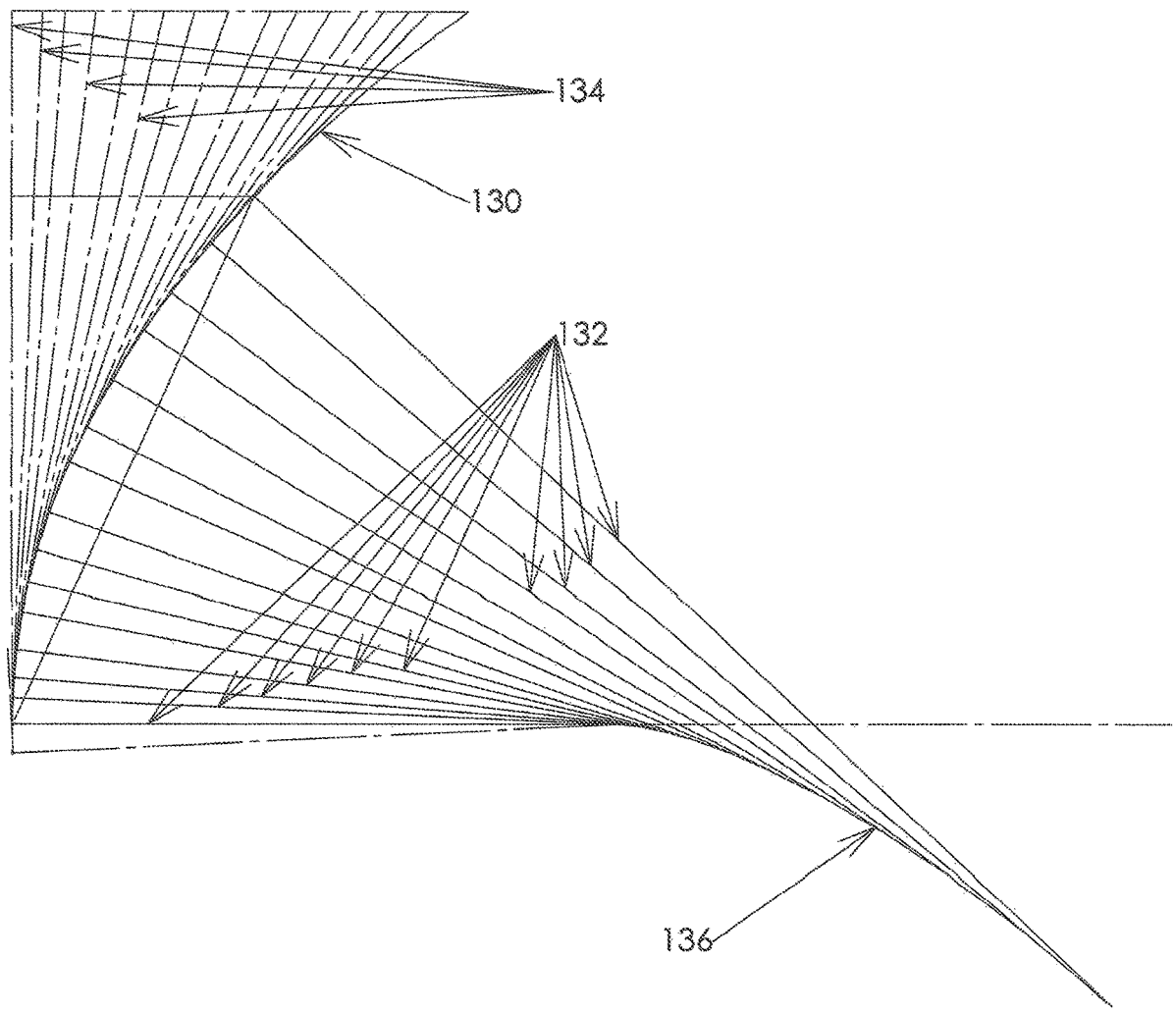
FIG. 5 is a depiction of a curve with its evolute; the evolute being expressed as an envelope of perpendiculars to the curve.

FIG. 5 shows the method of constructing the evolute of a conic-section curve 130 (in this case an ellipse) from orthogonals 132 to the curve. Each of these orthogonals 132 is projected to an intersection with the next one above it. The first orthogonal is ascertained by a method that involves minimal operator set-up and intervention. Each orthogonal after the first one is found by first moving the intercept-axis to a new position: the stepper-motor of the intercept unit 24 is stepped, under the control of the Microprocessor, while the output of the sensor 28 on the sensor line 163 is monitored. The sensor 28 provides an analog signal proportional to the intensity of the reflection 174, which is sent via sensor line 163 to an analog-to-digital converter, part of the Microprocessor 178 (see electronics block diagram of FIG. 7). The Microprocessor monitors the converted digital signal until a predetermined level of fall-off of intensity is found (this signals that an unobserved portion of the surface being tested 176 has been brought under observation); then the slope unit 22, while again monitoring the sensor line 163, is stepped through the sensor's maximum value, to find the value of slope that returns the brightest reflection of the laser beam at that intercept unit 24 position. The brightest reflection, measured as described via sensor line 163, always occurs when the beam is orthogonal to the surface, i.e., when the reflected beam 174 is tangent to the evolute. The intercept-axis value at this point is 'b' and the slope-value is 'm', and the equation for the orthogonal is $y=mx+b$. Since the position of the slope unit 22 at which the sensor's maximum value occurs must be passed to insure that it is a maximum, the final step in this process is to return the slope unit's position to that position of maximum sensor return, at which the process can begin again. The envelope 136 of the fifteen orthogonals shown approximates the evolute of the curve 130 to a degree of precision determined by how closely they are spaced. The dashed lines 134 on the left side of ellipse 130 are tangents to the ellipse at the points of origin of the orthogonals. It should be noted here that the evolute 136 of the curve 130 is as shown, regardless of whether the surface reflects light to the right as a concave surface or to the left as a convex surface. After each orthogonal is found, the slope-value of the slope-unit 22 is returned to the place where the intensity maximum was recorded, so that the process can be repeated. The process is terminated when the laser beam passes the outer edge of the surface under test.

Figure 6:
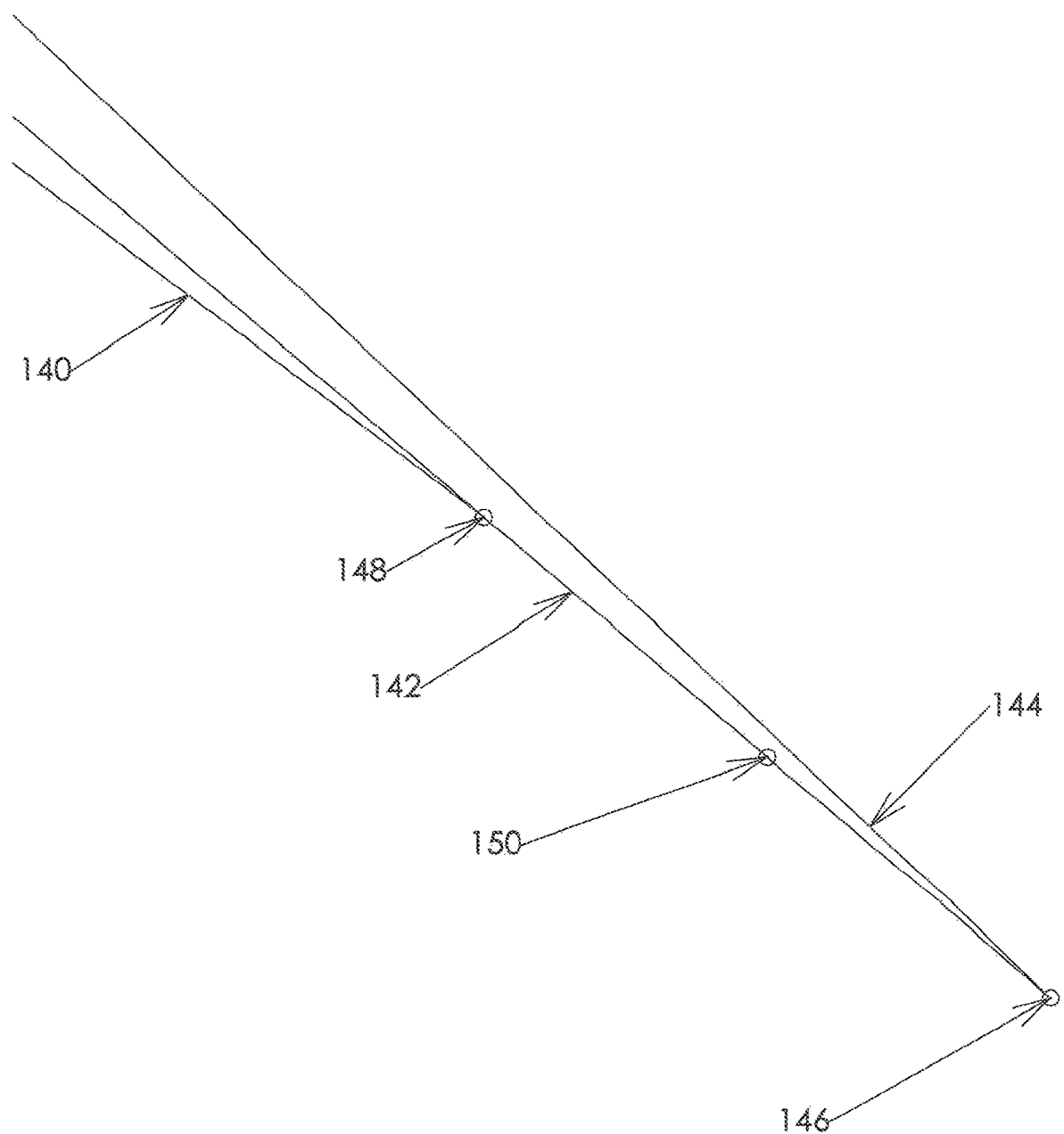
FIG. 6 is an enlargement of a small area of FIG. 5, showing three of the perpendiculars to the curve and their two relevant intersections.

FIG. 6 shows three of the orthogonal lines of FIG. 5 and indicates how the interpolation of their two intersections is done to give a point on the evolute. Uppermost orthogonal 144 intersects middle orthogonal 142 in point 146. Middle orthogonal 142 intersects lower orthogonal 140 in point 148. The center 150 of the segment between points 146 and 148 is taken as the center of curvature of the ellipse 130 at the point where the orthogonal 142 intersects it. In practice, the distance between points 146 and 148 will be on the order of a small fraction of a millimeter. Any point 150 ascertained by the interpolation method described above may be regarded as the center of curvature of the surface being characterized at the point from which the laser beam is reflected, as it will fall within a microscopic distance from the said center. It is therefore, within a very small tolerance, a point on the evolute of the surface. There are naturally some inexactitudes in (1) the point where the laser beam strikes the surface (because the beam makes a spot of finite width) and (2) the exact position of the point ascertained by the interpolation (due to the fact that there is a finite length between the two intersections). These two inexactitudes are minimized by minimizing the spacing of the points on the optical surface by the incremental "brightest reflection" method described herein, for any given beam width, but will vary for different optical surfaces.

Figure 7:
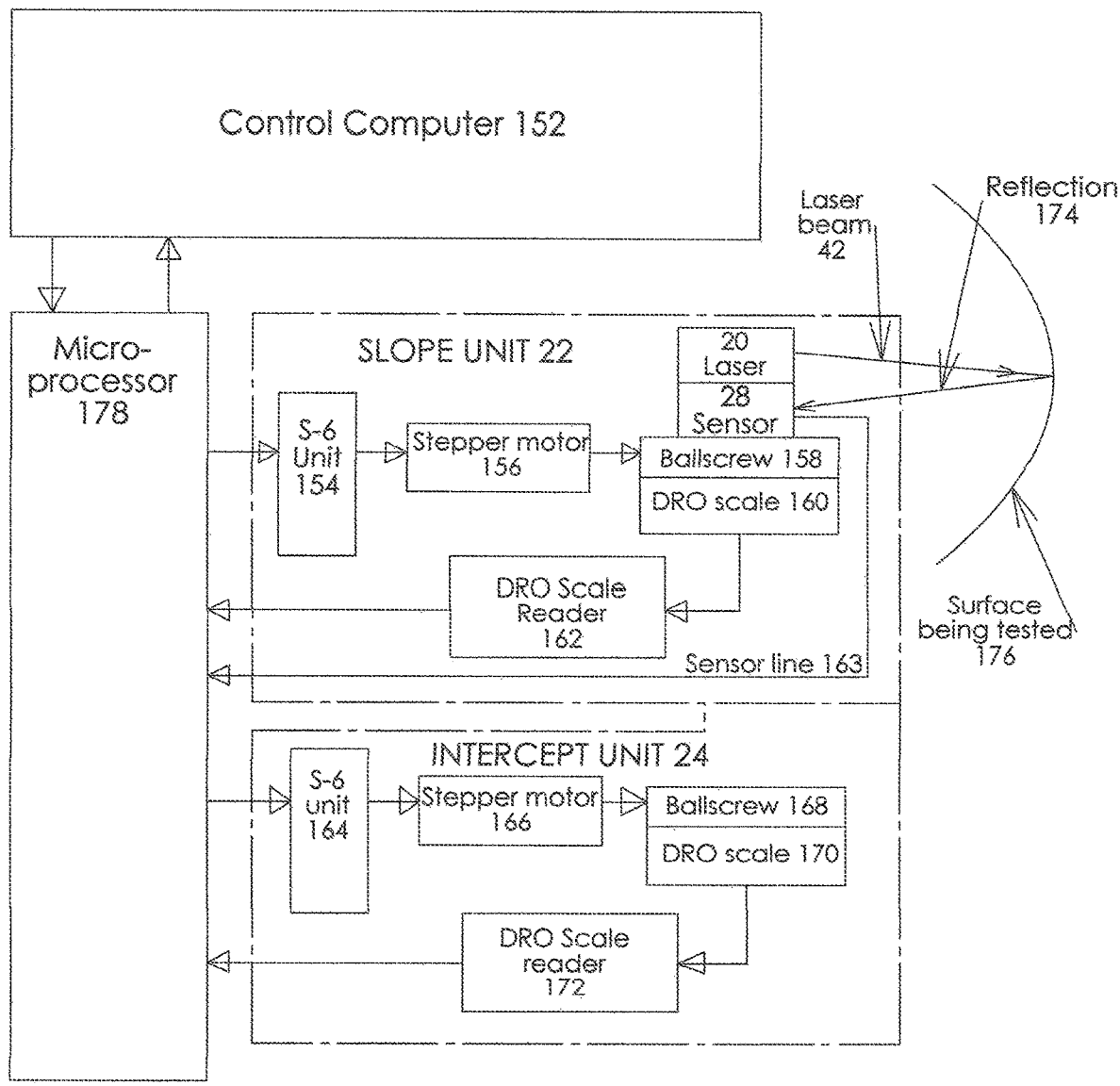
FIG. 7 is a block diagram of the electronics that interfaces the steppers, sensor, and digital readouts to the Microprocessor and thence to the control computer. It is an overall picture of the mechanics and electronics of the invention.

FIG. 7 is a block diagram of the electronics that interfaces the steppers, sensor, and digital readouts to the computer. It is an overall picture of the mechanics and electronics of the invention.

The Control computer 152 sends commands to the microprocessor 178 (a micro-controller, for example, available from Arduino of Somerville, Mass.) and receives data from it. The microprocessor 178 commands the two Stepper motor controllers 154 and 164 (e.g., S-6 controllers available from Compumotor, a division of Parker Hannifin Corporation of Charlotte, N.C.), and receives positioning information from the two DRO Scale readers 162 and 172, used in this embodiment of the invention (available from DRO Pros, 4992 Alison Parkway, Vacaville, Calif.), and intensity information on the reflected laser beam 174 from Sensor 28 via Sensor Line 163. Stepper motor controllers 154 and 164, with, respectively, stepper motors 156 and 166, in turn drive the two ball screws 158 and 168 that control, respectively, the slope of the laser beam 42 and the y-intercept of its origin. The ball screw 158 of the Slope Unit 22 is rigidly connected to the DRO scale 160, so that the position of the carriage of the ball screw 158 is read by the DRO scale reader 162, and transmitted back to the Microprocessor 178, from which it is relayed, with y-intercept information, to the control computer 152, and where it is interpreted as the slope of the beam. The laser head 20, mounted rigidly to the slope arm 46 (FIG. 3A) casts a narrow beam 42 (FIG. 2) onto the surface being tested 176, which is reflected 174 from that surface back to the sensor 28 of the laser head 20. The sensor 28 senses a maximum return when the laser beam 42 is oriented orthogonally (perpendicularly) to the optical surface being tested 176 (also seen at 21 in FIG. 1).

The Microprocessor 178 drives the ball screw 158 of the slope unit via Stepper motor controller 154 and stepper-motor 156 until the maximum return from the sensor 28 is sensed via the sensor line 163. The slope value "m" at this point, together with the intercept-axis position "b", fully define the line orthogonal to the optic at that intercept-axis position, as described in paragraph 0056 above.

The control computer 152 then drives the intercept unit's ball screw 168 via Stepper motor controller 164 and stepper-motor 166 until the return on the sensor line 163 falls off significantly from the maximum already sensed.

The cycle of the previous two paragraphs then repeats, until the laser beam passes the edge of the surface under test.

As noted above, the physical test stand 300 for the optical surface 21 is configured so that the optical surface 21 may be tested repeatedly in multiple angular orientations about its center, removed for corrective work, and replaced in an identical repeatable position and orientation on the test stand 300 for further testing.

Figure 8:
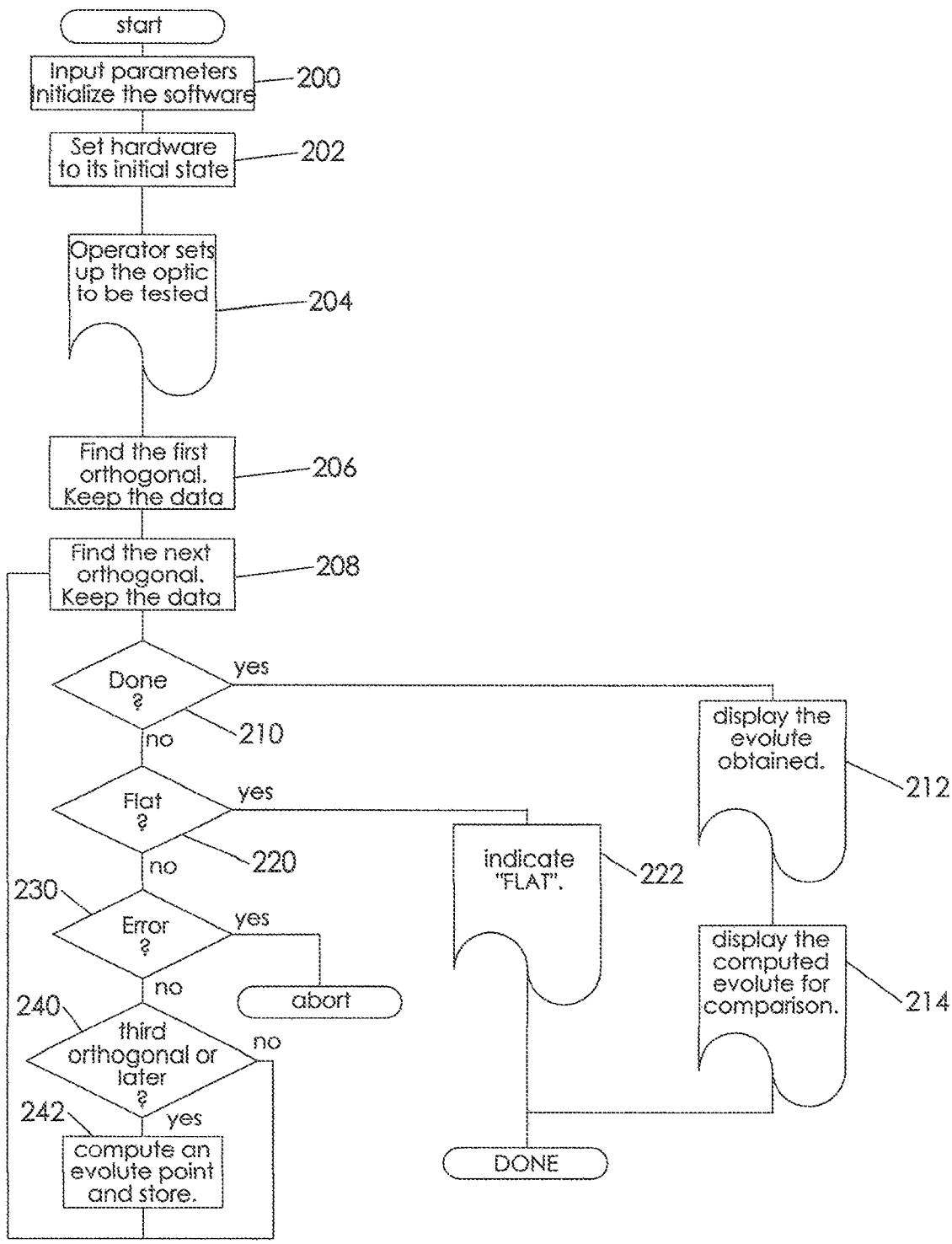
FIG. 8 is a flowchart of the overall software algorithm. No distinction is made between Microprocessor and control computer functions.

FIG. 8 is a flowchart depiction, in broad general strokes, of the software algorithms required to drive the invention. Input parameters, setup of the optic to be tested and characterized, and evaluation of the results, are all operator functions. Communication between the Microprocessor and the control computer is assumed rather than explicitly diagrammed, and no dichotomy of their separate functions is indicated as these will be obvious to a practitioner skilled in the field.

The operator first starts the Microprocessor software on the Microprocessor, then starts the control computer software on the control computer. At the control computer the operator then (200) enters the requisite parameters on the optic under test (e.g., whether it is convex, concave, or non-conic, its nominal radius of curvature, its diameter, and such other parameters as may be necessary). The operator then commands initialization of the Microprocessor and the invention via the control computer.

When this is complete, the Microprocessor informs the control computer, which then, under program control (202, 204) reminds the operator to place, center, and align, the optic to be tested on a test stand. When the operator signals that this is done (204), the control computer commands the Microprocessor to back off the intercept axis so that the cusp of the evolute may be found, and next, to find the first orthogonal (206). When the Microprocessor has done so, it transmits the slope and intercept data back to the control computer.

The control computer receives and stores these data, and then, in a software loop, commands the Microprocessor to find the next orthogonal (208). Each time it attempts this, the Microprocessor arrives at one of four scenarios; they are (1) it may find and transmit another pair of orthogonal data to the control computer (240, 242); (2) it may finish the test normally (210) (i.e., it may reach the extent of the optic under test); (3) it may find that the optic is a flat (220, 222); or (4) it may encounter an error which prevents the test from continuing (230). (1) and (2) are the normal results of the method; (3) will happen on the second orthogonal; and (4) is an abnormal termination which may occur for a variety of causes.

Previous methods used a mask over the optical surface with holes spaced evenly across the diameter of the surface or the measuring stick of A. W. Everest. (Everest promulgated the Everest scale in Amateur Telescope Making Advanced, edited by Albert G. Ingalls, on page 21, Publications of the Astronomical Society of the Pacific (1937). It works better than the mask, and makes observing the optic easier.) In the current method, the system moves from one intercept-axis position that gives the brightest reflection to a new one where the reflection has fallen off to close to nothing, and then swings the slope-axis until the reflection from the new position is maximum; then repeats the process. This may give a variable spacing of points across the optical surface, but guarantees that for the given beam width they can be no closer to each other. This is done as part of step (208) "find the next orthogonal" code, in the flowchart of FIG. 8. Said spacing will also vary depending on the character of the surface being tested.

In case (1) (it found the next orthogonal) the Microprocessor transmits slope and intercept data to the control computer which records them and ascertains where this orthogonal intersects the previous one, as diagrammed in FIG. 5 and FIG. 6. If there have been two or more orthogonals found before this one, the intersection of the two previous orthogonals, along with the intersection of the current one with the immediately previous one, is used to interpolate a point of the evolute, as follows: if $\{(b_1,m_1), (b_2,m_2), (b_3,m_3)\}$ are the first, second, and third orthogonals, respectively, then the point $P(x_p, y_p)$ on the evolute is given by $$x_P = \frac{b_1 - b_2}{2(m_2 - m_1)} + \frac{b_2 - b_3}{2(m_3 - m_2)};$$

$$y_P = \frac{m_2(b_1 - b_2)}{2(m_2 - m_1)} + \frac{m_3(b_2 - b_3)}{2(m_3 - m_2)} + \frac{b_2 + b_3}{2}.$$

When scenario (2) happens, the test is finished and the $(x_p, y_p)$ points may be plotted and compared with the calculated evolute.

We calculate the desired evolute as follows: assume that the curve whose evolute we wish to calculate is g(y), some function of y, with first and second derivatives g'(y) and g"(y) respectively. We may express the evolute as a parametric equation:

$$C_{y(x,y)} = \frac{1}{g''(y)}[g'(y)^2 + 1 + g(y) \cdot g''(y), y \cdot g''(y) - g'(y) \cdot (g'(y)^2 + 1)],$$

so that for any point (g(y),y) on the curve g(y), the corresponding center of curvature, or equivalently, the point on the evolute $P_E(x_E, y_E)$, is $$x_E = g(y) + \frac{(g'(y))^2 + 1}{g''(y)}$$

$$y_E = y - g'(y)\frac{(g'(y))^2 + 1}{g''(y)}$$

which may be plotted on the screen of the control computer and compared both visually and numerically with the evolute measured as above.

The desired curve of the surface is determined by the optical properties for which it is designed, and is therefore known by design. We calculate the evolute from the desired curve of the surface, by the mathematical formulae shown above. We make the surface, by grinding and polishing it, with standard optical methods. We mount the surface on the test stand and measure the evolute of the surface with the tester by the methods described herein, and get a very close approximation to its actual, physical evolute; then we compare the measured and calculated evolutes, ascertain where they differ by more than the allowed tolerance, and, if it does not fall within the allowance, do further optical work (i.e., grinding and polishing) on the surface to bring it within tolerance. We repeat the cycle of measurement and work until the surface is within tolerance.

CONCLUSION

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, if present, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

Those skilled in the art will appreciate that various changes and modifications may be made to the preferred embodiments, the invention in its broader aspects is not limited to the specific details, representative devices, and illustrative examples shown and described.

It is claimed:

1. A method for precisely and accurately characterizing an optical surface by using orthogonal specular reflection of a coherent monochromatic beam of light to reconstruct the evolute of the curve of the surface, the method including:
   transmitting a coherent monochromatic light beam multiple times, from incrementally successive positions across the optical surface being characterized, using a laser generating a monochromatic laser beam, and performing the following steps at each position:
   sensing, and measuring an intensity of, a reflection of the laser beam from each incrementally successive position on the optical surface using a sensor;
   transmitting a value of the intensity of the reflection of the laser beam to a microprocessor;
   controlling and measuring a position from which the laser beam that strikes the optical surface originates;
   reporting the position to the microprocessor as an intercept position;
   controlling and measuring a beam direction from which the laser beam that strikes the optical surface originates, the beam direction having a slope;
   reporting the slope of the beam direction to the microprocessor;
   controlling the beam direction to maximize the intensity;
   mathematically constructing a straight line, from the slope of the beam direction at each intercept position having maximum intensity, which straight line is constrained thereby to be orthogonal to the optical surface and thus tangent to the evolute of the surface, for each incrementally successive position across the optical surface, until the incrementally successive positions have crossed the entire surface, wherein a set of the straight lines comprises the envelope of the evolute of the optical surface.

2. The method of claim 1, wherein the optical surface is selected from the group consisting of concave, flat, convex, and a combination of concave, flat, and convex.

3. The method of claim 1, wherein the method has a degree of accuracy better than $1/100$ of the wavelength of sodium light for surfaces of focal ratio f/2.0 or slower.

4. The method of claim 1, wherein the method does not require the physical construction and preparation of a master surface for comparison.

5. The method of claim 1, wherein the method is automated via the microprocessor which controls linear movement of both axes algorithmically and which, once initiated, does not require further human judgment or intervention to accomplish the characterization once.

6. The method of claim 1, wherein a spacing or mesh of sample points on the surface under test, and thus a precision of the evolute, is determined solely by measuring a fall-off in intensity of the reflection of the laser beam, and not by a fixed mask.

7. A system for carrying out the method of claim 1, comprising:
   a test stand for the optical surface which is capable of holding the optical surface in a repeatable position and placing it in multiple repeatable rotational orientations;
   an intercept unit having a base fixed with respect to the test stand;
   a slope unit in which the laser head and the laser and sensor are mounted, the slope unit mounted to translate along the intercept carriage to various positions located toward and away from the center of the test stand and parallel to the chord of the optical surface, and to rotate to various angles about a second axis perpendicular to the first axis and also parallel to the chord of the optical surface, the slope unit having a slope unit orientation in each combination of position and angle.

8. The system of claim 7, wherein the intercept unit is a positioning and measuring system which controls the horizontal position at which the laser beam that strikes the optical surface originates, and which reports the horizontal position accurately;
   wherein the slope unit is a positioning and measuring system which controls the direction with respect to the axis of the optical surface at which the laser beam strikes the optical surface and which reports the slope of this direction (rise over run);
   wherein the laser head is a dual ball-socket with the two sockets orthogonally-placed, one carrying a laser mounted in a holed ball, the other carrying a sensor mounted in a second holed ball, so that a beamsplitter may be placed such that the sensor and laser are at optically identical positions.

9. The system of claim 8 wherein a microprocessor is interfaced to the foregoing, which initializes the mechanics, controls their motion, tracks motion limits, reads the laser beam sensor, and reads positioning information for transmission to a control computer interfaced to the microprocessor, which commands the motions of, and records positions of, both the intercept unit and the slope unit, and which monitors the intensity of the reflected beam as read by the sensor of the laser head.

10. In the system of claim 9, software for the microprocessor that accomplishes the functions described under the command of the control computer and transmits all relevant data to the control computer; and
   software for the control computer that (1) ascertains the intensity of the returned laser beam and maximizes it by varying the direction of the slope unit, thus assuring that the returned beam is orthogonal to the optical surface; (2) constructs and records a straight line from the slope and intercept (this line is also tangent to the evolute of the optical surface); (3) increases the intercept position by the smallest increment which causes intensity to fall off detectably; and repeats the process from (1) until the intercept measured is greater than the maximum half-diameter of the optic. The set of straight lines thus generated, all tangent to the evolute of the optical surface, thus form an envelope of the evolute.

11. A method for precisely and accurately characterizing an optical surface by using orthogonal specular reflection of a coherent monochromatic beam of light to reconstruct the evolute of the curve of the surface, the method including:
sequentially transmitting a coherent monochromatic light beam from incrementally successive positions across the optical surface being characterized using a laser;
sensing and measuring an intensity of a reflection of the light beam from each incrementally successive position on the optical surface using a sensor;
transmitting values of the intensity of each reflection of the light beam to a microprocessor;
controlling and measuring a position from which the light beam that strikes the optical surface originates;
reporting the position to the microprocessor as an intercept position;
controlling and measuring a beam direction from which the light beam that strikes the optical surface originates, the beam direction having a slope;
reporting the slope of the beam direction to the microprocessor;
controlling the beam direction to maximize the intensity; and
mathematically constructing a straight line, from the slope of the beam direction at each intercept position having maximum intensity, for each incrementally successive position across the optical surface, until the incrementally successive positions have crossed the entire surface, wherein a set of the straight lines comprises the envelope of the evolute of the optical surface.

12. The method of claim 11, wherein the optical surface is selected from the group consisting of concave, flat, convex, and a combination of concave, flat, and convex.

13. The method of claim 11, wherein the method has a degree of accuracy better than $\frac{1}{100}$ of the wavelength of sodium light for surfaces of focal ratio f/2.0 or slower.

14. The method of claim 11, wherein the method does not require the physical construction and preparation of a master surface for comparison.

15. The method of claim 11, wherein the method is automated via the microprocessor and stepper motors and does not require human judgment or intervention to accomplish the characterization once initiated.

16. The method of claim 11, wherein a spacing or mesh of sample points on the surface under test, and thus a precision of the evolute, is determined solely by measuring a fall-off in intensity of the reflection of the laser beam, and not by a fixed mask.

17. A system for carrying out the method of claim 11, comprising:
a test stand for the optical surface which is capable of holding the optical surface in a repeatable position and placing it in multiple repeatable rotational orientations;
an intercept unit having a base fixed with respect to the mount;
a slope unit in which the laser head and the laser and sensor are mounted, the slope unit mounted to translate along the intercept carriage to various positions located toward and away from the center of the test stand and parallel to the chord of the optical surface, and to rotate to various angles about a second axis perpendicular to the first axis and also parallel to the chord of the optical surface, the slope unit having a slope unit orientation in each combination of position and angle.

18. The system of claim 17, wherein the intercept unit is a positioning and measuring system which controls the horizontal position at which the laser beam that strikes the optical surface originates, and which reports the horizontal position accurately;
wherein the slope unit is a positioning and measuring system which controls the direction with respect to the axis of the optical surface at which the laser beam strikes the optical surface and which reports the slope of this direction (rise over run);
wherein the laser head is a dual ball-socket with the two sockets orthogonally-placed, one carrying a laser mounted in a holed ball, the other carrying a sensor mounted in a second holed ball, so that a beamsplitter may be placed such that the sensor and laser are at optically identical positions.

19. The system of claim 18 wherein a microprocessor is interfaced to the foregoing, which initializes the mechanics, controls their motion, tracks motion limits, reads the laser beam sensor, and reads positioning information for transmission to a control computer interfaced to the microprocessor, which commands the motions of, and records positions of, both the intercept unit and the slope unit, and which monitors the intensity of the reflected beam as read by the sensor of the laser head.

20. In the system of claim 19, software for the microprocessor that accomplishes the functions described under the command of the control computer and transmits all relevant data to the control computer; and
software for the control computer that (1) ascertains the intensity of the returned laser beam and maximizes it by varying the direction of the slope unit, thus assuring that the returned beam is orthogonal to the optical surface; (2) constructs and records a straight line from the slope and intercept (this line is also tangent to the evolute of the optical surface); (3) increases the intercept position by the smallest increment which causes intensity to fall off detectably; and repeats the process from (1) until the intercept measured is greater than the maximum half-diameter of the optic. The set of straight lines thus generated, all tangent to the evolute of the optical surface, thus form an envelope of the evolute.

* * * * *